UNITED STATES PATENT OFFICE.

WILLIAM MORRISON, OF DES MOINES, IOWA.

PROCESS OF REMOVING GOLD, SILVER, COPPER, AND PLATINUM FROM LEAD ALLOYS.

No. 890,160.  Specification of Letters Patent.  Patented June 9, 1908.

Application filed April 18, 1907. Serial No. 368,892.

*To all whom it may concern:*

Be it known that I, WILLIAM MORRISON, a citizen of the United States, residing at Des Moines, in the county of Polk and State of Iowa, have invented a certain new and useful Process of Removing Gold, Silver, Copper, and Platinum from Lead Alloys, of which the following is a specification.

My object is to provide a process of this kind, especially adapted for removing gold or silver or copper or platinum from lead alloys, or for the direct refining of gold that is alloyed with silver and copper or other alloys, and is more especially designed for use in cases where it is desirable to keep the several lots or quantities of alloys of said metals entirely separated from each other, during the entire process.

A further object is to provide a process of this kind which may be quickly completed, so that the precious metals from the quantity of material presented may be removed and reduced to pure form within a few hours. In this connection, I am aware that there are good processes now in general use, for removing gold, silver, copper and platinum from alloys, which may be used advantageously when the amount of time employed in the final separation of the precious metals is not important.

My invention consists in the combination of the various steps of the process, whereby the objects contemplated are attained, as hereinafter more fully set forth and pointed out in my claims.

The means for combining gold, silver, copper and platinum with lead alloy from waste materials containing these metals, or any of them, is well known, and forms of itself no part of my present invention. I shall, therefore, in the following description refer only to the process for removing gold, silver, copper and platinum from a lead alloy, with these metals.

I place the lead alloy of precious metals in a crucible and add zinc and a suitable flux, such for instance as cyanid of potash, which I have found to be a desirable flux for this purpose. I apply heat to the crucible until the contents of the crucible melts, and reaches a dull red heat.

It does not make any difference in the result, if the lead alloy of the precious metals is melted before adding the zinc and the flux, or after, and the following claims are not to be construed as limited to time of adding the zinc or the flux relative to each other, or to the melting of the lead alloy of the precious metals. When the material is melted, I begin to agitate it by stirring or otherwise and the heat and agitation are applied to the material until the zinc approaches the point of volatilization. This volatilization of the zinc may readily be determined by noting small yellow blazes rising through the flux. I preferably shut off the heat just before this volatilization begins, although no damage will result if only slight volatilization takes place, and continue the agitation for a short time and then allow the crucible to cool slowly, so that the zinc and precious metals may separate from the lead and rise to the top. I then break the crucible, or before cooling it may be poured off into another vessel previously heated.

The material thus treated will be in metallic form and the lead will be thoroughly separated from the other ingredients in a layer at the bottom of the vessel. This layer will be only slightly attached to the other material because the lead cools last and contracts and partially separates from the other material when cooling, so that the lead may, if desired, be easily broken off or cut away from the other material. In this step of the process, it is necessary that the material used for a flux shall be capable of melting at comparatively low temperature so that it will form a liquid and cover the other material before the zinc begins to volatilize, and for this reason I prefer to use cyanid of potash as a flux because, when in liquid form, and covering the other materials, it will take up any oxygen that may be present and form a potassium cyanate.

After the material has been treated as before described, and assuming that it is desired to remove the gold only, and that no platinum or other metal is present that is insoluble in nitric acid, I place the material either with or without the lead, in a suitable vessel and cover it with strong nitric acid. This will dissolve all the materials except the gold, which will be in powder or granular form, and the lead if any be present, which will be in metallic form, and will be only slightly affected by the acid. I then pour off the liquid and wash the remaining material with water. I then remove the lead, and then melt the gold to reduce it to pure metallic form.

If it is desired to remove both the gold and platinum, I place the material in a vessel and add boiling concentrated sulfuric acid. This will dissolve the silver, zinc, copper and other impurities. I then pour off the liquid and wash the remaining material with hot water. I then remove the lead, if any is present, as before described, and separate the platinum and gold as follows: The material is placed in a suitable vessel and covered with a diluted solution of nitric muriatic acid, which will dissolve the gold and leave the platinum. As a substitute for the diluted solution of nitric muriatic acid, I have found that cyanid of potash, in solution, may be successfully used. In some instances I prefer to separate the platinum and gold as follows: I first place the platinum and gold in a suitable vessel and add a strong solution of nitric muriatic acid and apply heat. This causes both the metals to be dissolved. I then reduce the bulk of the solution by evaporation, and I then precipitate the platinum by adding a saturated solution of chlorid of ammonia in the presence of alcohol. The gold solution may then be poured off and the gold in turn precipitated with oxalic acid in solution, at boiling heat, or ferrous sulfate, or the like.

In cases where it is desired to save the gold, silver, copper and platinum, I first place the material in a suitable vessel and cover it with hydrochloric acid or diluted sulfuric acid. This will dissolve the zinc, leaving all the gold, silver, platinum and copper in powder or granular form, and the lead in metallic form. I then wash off the acid with the zinc. I then add just enough nitric acid to the residue to dissolve the copper and silver. I then precipitate the silver with hydrochloric acid, pour off the solution and wash the residue and precipitate the copper with oxid of calcium. The platinum and gold are then separated as before described. The advantage of this part of the process is that the zinc is first removed in the hydrochloric acid, hence there is only a small quantity of material remaining to be treated with nitric acid, and only a small quantity, just sufficient, is required to dissolve the copper and silver. Then when the silver is precipitated with hydrochloric acid, the copper only remaining in the solution, which can be cheaply and directly precipitated by oxid of calcium when the other metals have been previously removed from the solution.

In some instances the lead alloy of gold may be treated by melting it with zinc and without any cyanid of potash or other flux, then stirring and permitting it to slowly cool and separate. However, I prefer to use the flux as before described.

In cases where it is desired to use the process in the direct refining of gold that is alloyed with the ordinary commercial alloys consisting of silver and copper, or any other alloys, I employ only that part of the process before described which consists in placing the material to be treated in a crucible, applying heat and adding zinc and cyanid of potash, which will result as before explained, in combining zinc with the gold and the alloying metals, so that the acid herein described may be applied to the material thus treated, and dissolve all but the gold. By this means gold that is alloyed with silver and copper or other materials, may be reduced to pure form in a comparatively short time, and it is obviously not necessary to first alloy the material with lead.

I am aware that other metals may be used as a substitute for the zinc in the process as herein described, and I do not desire to be understood as limiting myself to the use of zinc only. However, zinc is the cheapest and most satisfactory metal I have found that will combine with gold and its various alloys, in such a manner that the acids will operate to dissolve all of the material except the gold.

In the following claims I have employed the term "zinc" to indicate either pure zinc or some metal that will have an equivalent action when treated in the manner herein described.

I claim as my invention:—

1. The process of separating gold from alloys, which consists in melting the same, in combination with zinc, and a material that will melt and form a flux before the zinc volatilizes, and then permitting the material to cool.

2. The process of separating gold from alloys, which consists in melting the same in combination with zinc and a material that will melt and form a flux before the zinc volatilizes, then agitating the material and permitting it to cool.

3. The process of separating gold from lead alloys of gold, which consists in melting the same, in combination with zinc and a material that will melt and form a flux at a temperature lower than the volatilizing point of the zinc, and then permitting it to cool.

4. The process of separating gold from lead alloys of gold, which consists in melting the same, in combination with zinc and a material that will melt and form a flux at a temperature lower than the volatilizing point of the zinc, then agitating it and permitting it to cool.

5. The process of separating gold from lead alloys of gold, which consists in melting the same in combination with zinc and cyanid of potash, and then permitting it to cool.

6. The process of separating gold from lead alloys of gold, which consists in melting the same in combination with zinc and cyanid of potash, agitating the same and permitting it to cool.

7. The process of separating gold from lead alloys of gold, which consists in melting the same, in combination with zinc and a material that will melt and form a flux at a temperature lower than the volatilizing point of the zinc, then agitating it and permitting it to slowly cool, together with the heated vessel in which it is contained.

8. The process of separating gold from lead alloys of the precious metals, which consists in melting the same in combination with materials that will separate the precious metals from the lead, then adding to the separating material and the precious metals, a material that will dissolve all of the separating material and leave the precious metals.

9. The process of separating gold from lead alloys of the precious metals, which consists in first melting the same and adding materials that will separate the precious metals from the lead, then adding to the separating material and the precious metals, a material that will dissolve all of the separating material and leave the precious metals, and then separating the precious metals.

10. The process of separating gold and platinum from lead alloys of the precious metals, which consists in melting the same in combination with materials that will separate the precious metals from the lead, then adding to the precious metals and the separating material, a material that will dissolve the separating material and some of the precious metals, leaving the gold and platinum, and then separating the gold and platinum.

11. The process of separating gold from lead alloys of gold, which consists in melting the same in combination with materials that will separate the precious metals from the lead, then removing the lead, then adding a material that will dissolve the separating material and leave the gold, then washing the gold, and then melting it to metallic form.

12. The process of separating gold from lead alloys of the precious metals, which consists in melting the same in combination with a material that will separate the precious metals from the lead, then dissolving the separating material and all of the other materials except the gold and the lead in strong nitric acid, then removing the lead, then washing the gold and melting it to reduce it to metallic form.

13. The process of separating gold from lead alloys of the precious metals, which consists in melting the same in combination with materials that will separate the precious metals from the lead, then adding an acid that will dissolve silver, zinc, copper and the like, and leave both the gold and platinum, then washing the residue, then treating it with a material that will dissolve the gold, and then adding a material that will precipitate the gold.

14. The process of separating gold from lead alloys, of the precious metals, which consists in melting the same in combination with materials that will separate the precious metals from the lead, then adding boiling concentrated sulfuric acid, then pouring off the liquid, then washing the residue with hot water, then adding a diluted solution of nitric muriatic acid, then pouring off the liquid, and then precipitating the gold in the liquid.

15. The process of separating gold from lead alloys of the precious metals, which consists in melting the same in combination with materials that will separate the precious metals from the lead, then adding boiling concentrated sulfuric acid, then pouring off the liquid, then washing the residue with hot water, then adding a diluted solution of nitric muriatic acid, then pouring off the liquid, and then precipitating the gold in the liquid with heated oxalic acid.

16. The process of separating gold from lead alloys of the precious metals, which consists in melting the same in combination with materials that will separate the precious metals from the lead, then adding boiling concentrated sulfuric acid, then pouring off the liquid, then washing the residue with hot water, then adding to the residue a diluted solution of nitric muriatic acid, then pouring off the liquid, then precipitating the gold in the liquid with heated oxalic acid, then precipitating the platinum by adding a saturating solution of chlorid of ammonia in the presence of alcohol.

17. The process of separating gold from lead alloys of the precious metals, which consists in melting the same in combination with materials that will separate the precious metals from the lead, then adding a material that will dissolve the zinc and leave the gold, silver, platinum, copper and the like, in powder or granular form, then washing off the acid, then adding nitric acid to dissolve the copper, and silver, then precipitating the silver with hydrochloric acid, and finally precipitating the copper with oxid of calcium.

18. The process of separating gold from lead alloys, of gold, which consists in melting the same in combination with zinc, and a material that will melt and form a flux before the zinc volatilizes, and then permitting the material to cool, then adding to the separating material and the precious metals, a material that will dissolve all of the separating material and leave the precious metals, and then separating the precious metals.

19. The process of separating gold from lead alloys of gold, which consists in melting the same, in combination with zinc and a material that will melt and form a flux at a temperature lower than the volatilizing point of the zinc, then agitating it and permitting it to cool, then adding to the separating material and the precious metals, a material that will dissolve all of the separating material and leave the precious metals, and then separating the precious metals.

20. The process of separating gold from lead alloys of gold, which consists in melting the same in combination with zinc and cyanid of potash, and then permitting it to cool, then adding to the separating material and the precious metals a material that will dissolve all of the separating material and leave the precious metals, and then separating the precious metals.

21. The process of separating gold from lead alloys of gold, which consists in melting the same in combination with zinc and a material that will melt and form a flux before the zinc volatilizes, then agitating the material and permitting it to slowly cool, together with the heated vessel in which it is contained, then adding to the separating material and the precious metals, a material that will dissolve all of the separating material and leave the precious metals, and then separating the precious metals.

22. The process of separating gold from lead alloys of gold, which consists in melting the same, in combination with zinc and a material that will melt and form a flux at a temperature lower than the volatilizing point of the zinc, and then permitting it to slowly cool, together with the heated vessel in which it is contained, then adding to the separating material and the precious metals a material that will dissolve all of the separating material and leave the precious metals, and then separating the precious metals.

23. The process of separating gold from lead alloys of gold, which consists in melting the same in combination with zinc and cyanid of potash, and then permitting it to slowly cool, together with the heated vessel in which it is contained, then adding to the separating material and the precious metals, a material that will dissolve all of the separating material and leave the precious metals, and then separating the precious metals.

24. The process of separating gold from lead alloys of gold, which consists in melting the same in combination with zinc and cyanid of potash, and then permitting it to slowly cool, together with the heated vessel in which it is contained, then adding to the separating material and the precious metals, a material that will dissolve all of the separating material and leave the precious metals, and then separating the precious metals.

WILLIAM MORRISON.

Witnesses:
 RALPH ORWIG,
 S. F. CHRISTY.